Figure 1:
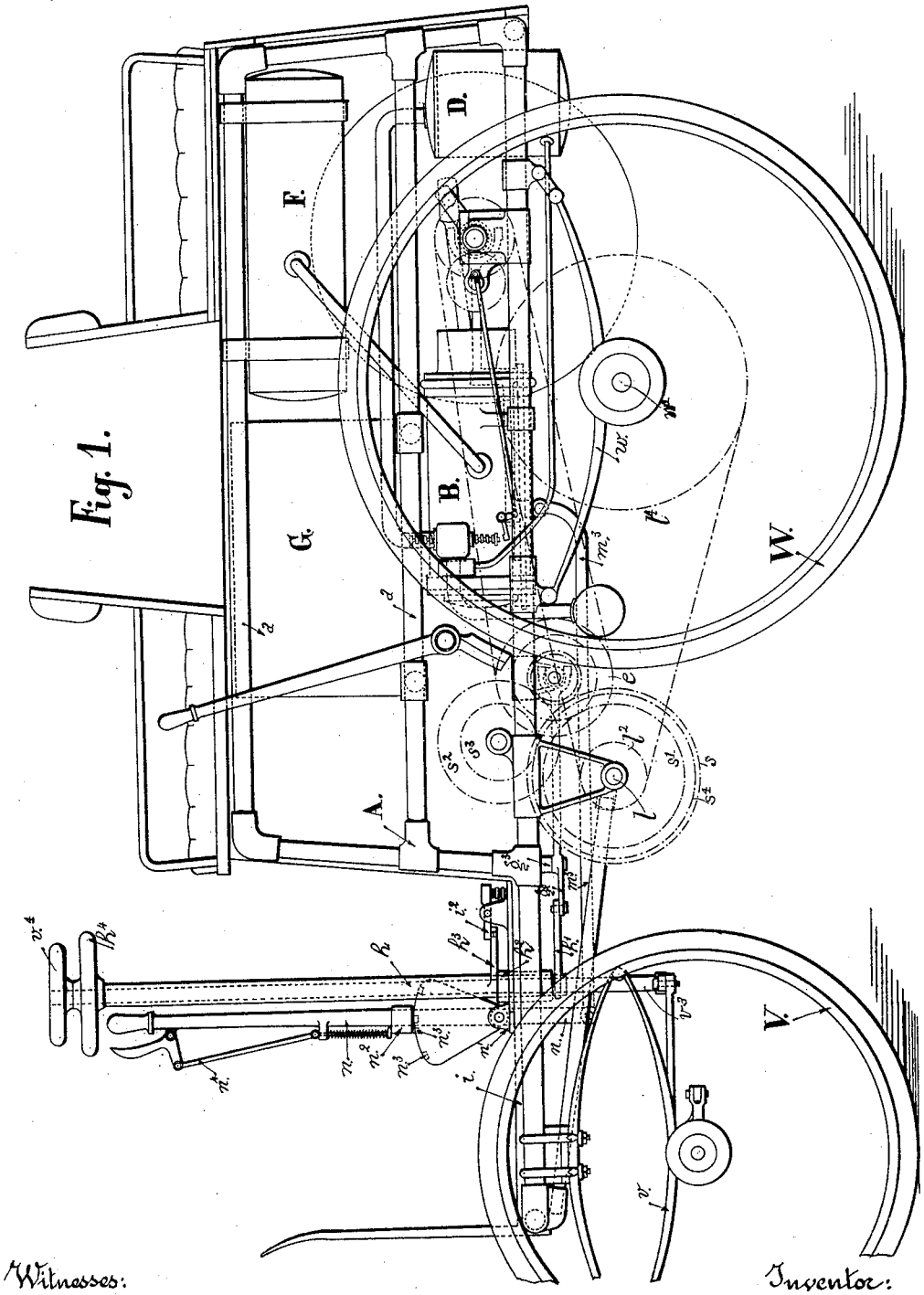

No. 636,529. Patented Nov. 7, 1899.
E. HENRIQUEZ.
MOTOR CARRIAGE.
(Application filed Jan. 18, 1899.)
(No Model.) 4 Sheets—Sheet 1.

Witnesses:
Jeanne Grimme
Charles Grimme

Inventor:
Edward Henriquez

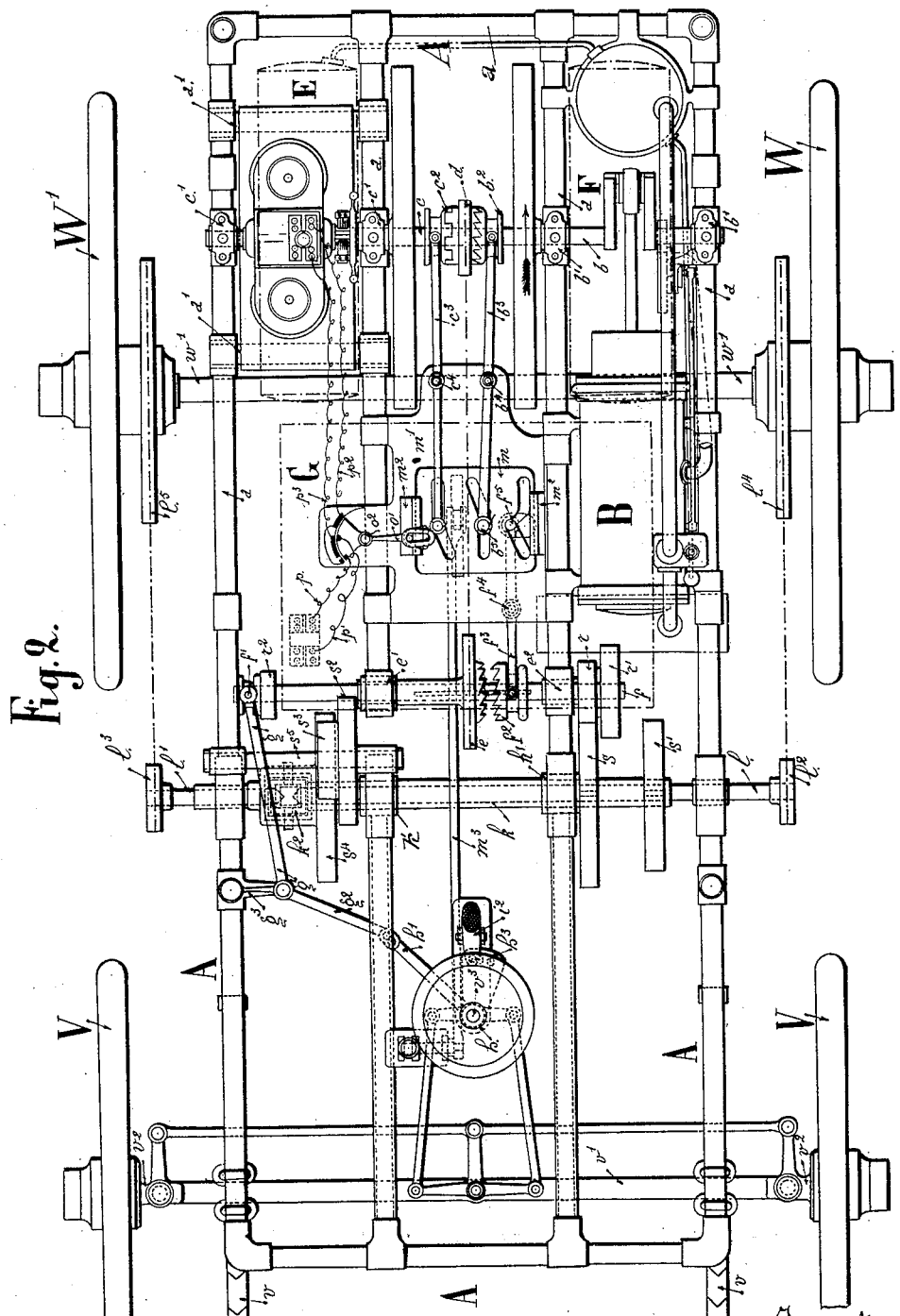

No. 636,529. Patented Nov. 7, 1899.
E. HENRIQUEZ.
MOTOR CARRIAGE.
(Application filed Jan. 18, 1899.)
(No Model.) 4 Sheets—Sheet 3.
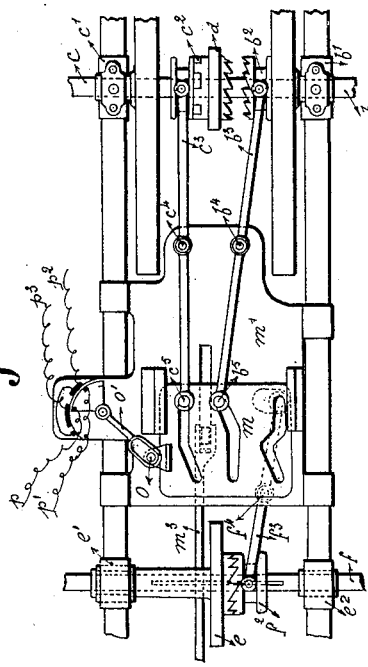
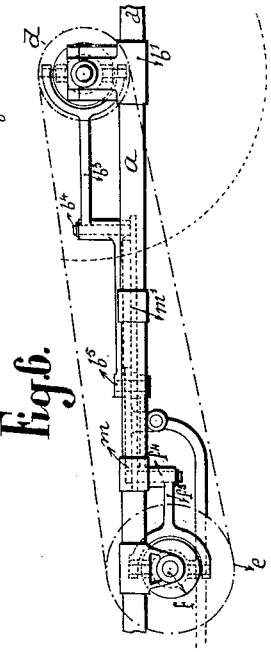
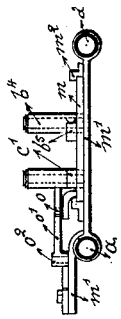
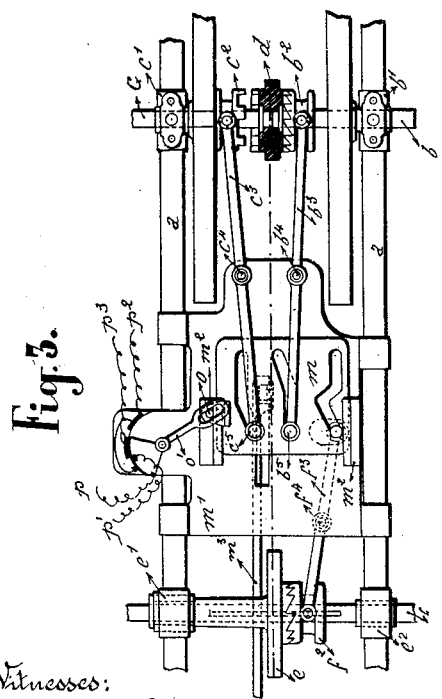
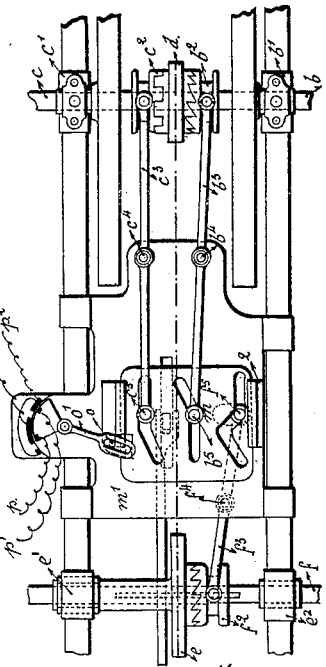
Witnesses: Inventor:

No. 636,529. Patented Nov. 7, 1899.
E. HENRIQUEZ.
MOTOR CARRIAGE.
(Application filed Jan. 18, 1899.)
(No Model.) 4 Sheets—Sheet 4.
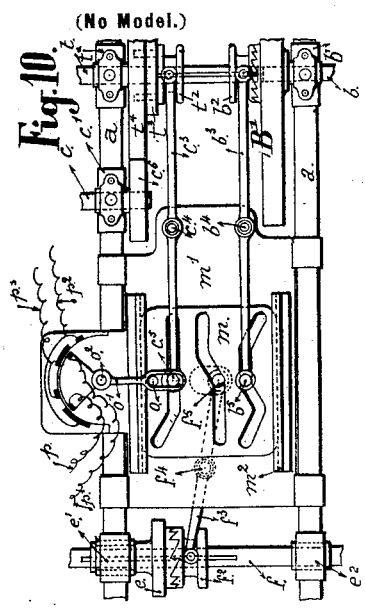
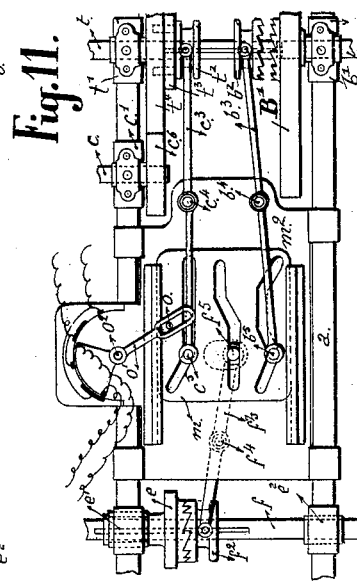
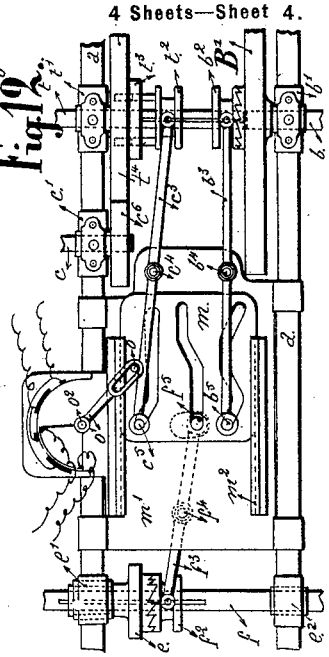
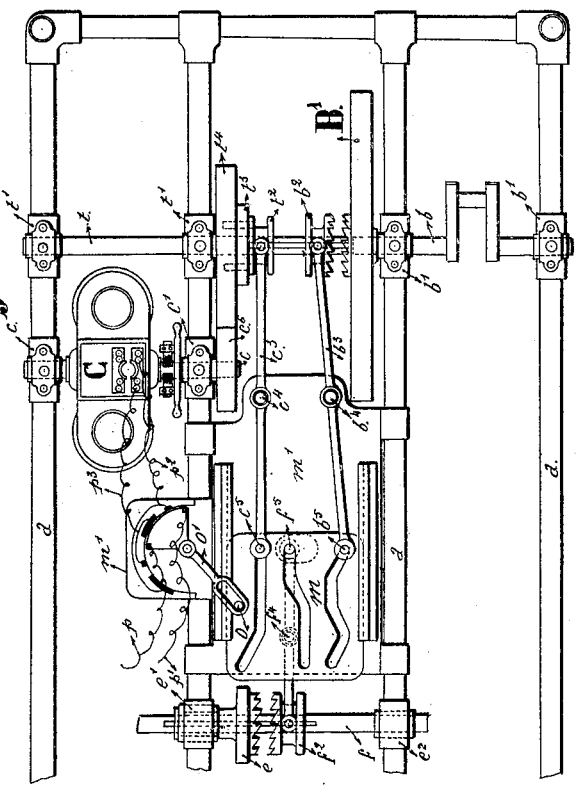
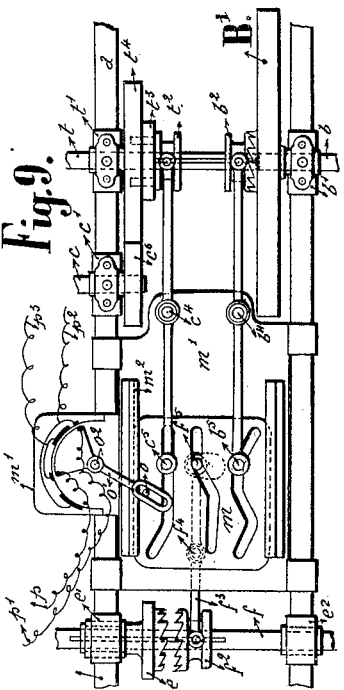
Witnesses:
Jeanne Grimme
Charles Grimm
Inventor:
Edward Henriquez
THE NORRIS PETERS CO., PHOTO-LITHO., WASHINGTON, D. C.

UNITED STATES PATENT OFFICE.

EDOUARD HENRIQUEZ, OF BRUSSELS, BELGIUM.

MOTOR-CARRIAGE.

SPECIFICATION forming part of Letters Patent No. 636,529, dated November 7, 1899.

Application filed January 18, 1899. Serial No. 702,513. (No model.)

*To all whom it may concern:*

Be it known that I, EDOUARD HENRIQUEZ, a citizen of Curaçoa, Dutch West Indies, residing at Brussels, in the Kingdom of Belgium, have invented certain new and useful Improvements in Motor-Carriages, of which the following is a specification.

This invention relates to carriages and vehicles driven by motive power; and it consists in the combined use and arrangement on said carriages or vehicles of an engine actuated by vaporized liquid hydrocarbons and an electric motor of a kind that can be reversed and act as a dynamo, and electric accumulators in combination with gearing, clutches, and switches so arranged and operated that, first, the engine can propel the carriage; secondly, the electric motor can propel the carriage; thirdly, the engine can drive the motor for charging the accumulators, and preferably also that, fourthly, the engine and motor combined can propel the carriage, and, fifthly, that the engine can run idle; and the improvements further consist in the arrangement or construction of the mechanism for operating the clutches and switch in the manner required for effecting the above changes or connections.

The engine may be a small high-speed engine making the same number of revolutions as the electric motor, or it may be an engine of larger size making a smaller number of revolutions than the motor and driving it in any suitable manner.

On the drawings appended hereunto my improvements are shown applied to a four-wheeled carriage as an instance of how my invention may be carried out; but of course it is applicable to other kinds of vehicles, and the relative positions of the engine and motor and the arrangement of the gearing, clutches, and switch may be varied to suit the different sizes and constructions of such vehicles.

Figures 1 to 7 show an arrangement of an automobile carriage with an engine and electric motor revolving at the same speed and the clutch mechanism for the same, Fig. 1 representing a side view of the same with the outer covering of the body removed; Fig. 2, a plan of the same with the upper parts above the engine removed; Figs. 3, 4, and 5, plan views of the clutch mechanism in three different positions; Fig. 6, a side view, and Fig. Fig. 7 an end view, of the same. Figs. 8 to 12 show an arrangement with an engine revolving at a less speed than the electric motor, in top views, with the clutch mechanism in five different positions.

Referring first to Figs. 1 to 7, A is the carriage-frame, B the engine, C the electric motor, D the vaporizer, E the oil-cistern and F the water-cistern for the engine, and G the box containing the accumulator, all of which may be of any suitable kind, their special construction not forming a part of my invention.

The framing of the carriage-body is shown formed of tubes $a$, connected by elbow and T-brackets in the well-known manner, the lower part of the frame being formed of four such tubes. Upon the two left-hand tubes the engine B is fixed and its crank-shaft $b$ supported in bearings $b'$ on the tubes. To the two right-hand frame-tubes cross-tubes $a'$ are connected, carrying the bed-plate of the electric motor C, hereinafter called simply the "motor," the shaft $c$ of which is supported in bearings $c'$, fixed upon the frame-tubes. The crank-shaft $b$ and motor-shaft $c$ are in line and meet in the middle of the frame without being connected to each other. One of them may have a pivot of reduced diameter turned on its end entering into a bore in the end of the other shaft. The chain-wheel $d$ is mounted loose upon both shaft ends and held between collars on the same, as shown in section on Fig. 3. The chain-wheel is formed with a clutch member on each side, and corresponding clutch members $c^2$ and $b^2$ are mounted on the shaft $c$ and $b$, respectively, these clutch members or clutch-boxes sliding on keys and rotating with the respective shafts. The chain-wheel $d$ drives, by a chain, a chain-wheel $e$ when $d$ is rotated. The chain-wheel $e$ has a long boss revolving in the bearing $e'$ and held in position by collars. A shaft $f$ passes freely through the boss of the chain-wheel $e$ and a bearing $e^2$. Upon it is mounted the clutch member $f^2$, which has a key fixed in it that enters a long key-groove formed in the shaft, so that when the clutch member or box is engaged with the clutch-teeth, forming the clutch member on the side of the chain-wheel $e$, the latter drives the shaft $f$. Upon the shaft $f$ are fixed three spur-wheels $r$, $r'$, and $r^2$ and a grooved collar $f'$, into which engages the fork $g$ of the limb $g'$ of a bell-crank lever fulcrumed on a bracket $g^3$, the other limb $g^2$ of which engages with a pin into a slot in the end of the lever $h'$, which is fixed on the end of the tubular pillar $h$. The latter turns in a socket $h^2$, fixed to the foot-plate $i$ of the carriage, and is provided with a sector $h^3$. A spring-catch $i^2$, capable of being operated by the foot of the driver, engages into notches or holes of the sector and locks the pillar $h$, which can be turned by the hand-wheel $h^4$ in position, thereby determining the position of the shaft $f$ in its longitudinal direction.

Upon a long sleeve $k$, supported in bearings $k'$, three spur-wheels $s$, $s'$, and $s^4$ are fixed, the latter of which is in gear with a spur-pinion $s^3$, cast in one with the spur-wheel $s^2$, which is fixed on a short shaft $s^5$. In the positions shown on the drawings the wheel $r$ gears with the wheel $s$, and when the shaft $f$ is rotated it drives the sleeve $k$ at a certain moderate speed. By shifting the shaft $f$ to the left the wheel $r$ is drawn out of gear and the wheel $r'$ brought into gear with the wheel $s'$, the sleeve being now rotated at an increased speed. By shifting the shaft $f$ farther to the left, the wheel $r'$ is drawn out of gear and the wheel $r^2$ brought into gear with wheel $s^2$, and, through the wheels $s^3$ and $s^4$, drives the sleeve $k$ in the reverse direction at a greatly-reduced speed. To the wheel $s^4$ or the sleeve $k$ is attached the box $k^2$, containing the well-known epicyclic balance-gear, consisting of two bevel-wheels mounted on studs fixed in the box, and two bevel-wheels fixed on the ends of the shafts $l$ and $l'$, respectively, whereby these shafts are rotated. Said shafts form together the driving-shaft of the automobile vehicle. The shaft $l$ carries at its outer end a chain-wheel $l^2$, driving by a chain the large chain-wheel $l^4$ on the hub of the left-hand driving-wheel W, and the shaft $l'$ carries a similar wheel $l^3$, driving the chain-wheel $l^5$ on the hub of the right-hand driving-wheel W'. By this arrangement of gearing the carriage can be propelled forward at two different speeds and backward at a reduced speed when the shaft $f$ is rotated, while the engine or motor revolve at their full speed and exercise their full powers. The arrangement of gearing for transmitting the motion of the shaft $f$ to the driving-wheels of the carriage, however, may be varied in any way suitable for the kind of carriage or vehicle to which my invention is applied, and the arrangement hereinbefore described is only shown as an instance of how the propulsion of the vehicle may be obtained.

The mechanism for operating the clutch-boxes and switch, so that the engine may drive the motor for charging the accumulators or drive the carriage or that the motor may drive the carriage or the engine and motor combined drive the carriage, is arranged as follows: The clutch-boxes $b^2$, $c^2$, and $f^2$ are each formed with a circular groove into which the forked ends of the levers $b^3$, $c^3$, and $f^3$ respectively engage with pins in the usual manner. These levers are fulcrumed on studs $b^4$, $c^4$, and $f^4$, fixed in a plate $m'$, which is mounted upon the two middle tubes of the lower carriage-frame. Upon this plate is arranged another plate $m$, capable of sliding thereon between guides $m^2$, fixed on the plate $m'$, Figs. 2, 6, and 7. On the plate $m$ slots are formed into which the pins $c^5$, $b^5$, and $f^5$, fixed in the other ends of the levers $b^3$, $c^3$, and $f^3$, enter, the plate $m'$ being slotted where required for these pins. To the plate $m$ a bracket $m^2$ is fixed, which by a rod $m^3$ is connected to the bottom end of the hand-lever $n$, Fig. 1, which is fulcrumed on the bracket $n'$, fixed upon the foot-plate of the carriage, and is provided with a spring-catch $n^2$, operated by a trigger $n^4$, which catch engages into notches of the sector $n^3$. By moving the hand-lever the plate $m$ can be shifted and locked in several positions by the catch and notches in the sector. Upon the plate $m$ is further fixed a pin $o$, Figs. 2 and 7, entering into the slotted lever $o'$, which is fulcrumed on a stud $o^2$, fixed in the plate $m'$. The other end of the lever forms a sector into which two insulated electrical contact-pieces are fixed, which by the wires $p$ and $p'$ are connected to the terminals of the storage battery contained in the box G. Facing the sector other insulated contacts are fixed upon an extension of the plate $m'$, the two outer ones of which are connected to each other and by the wire $p^2$ to one of the poles of the electric motor, while the middle contact is connected by the wire $p^3$ to the other pole. By shifting the sector the connections can be reversed. When the sliding plate $m$ is in the position shown on Fig. 2, the clutch-boxes $b^2$ and $c^2$ are both engaged with the clutches formed on the chain-wheel $d$, while the clutch-box $f^2$ is disengaged. The motion of the engine crank-shaft in the direction of the arrow is transmitted, through the clutch-boxes $b^2$ and $c^2$, to the shaft $c$ of the electric motor, which is rotated and, acting as dynamo, charges the accumulator, the current passing, say, through wires $p^2$ $p$ to the same and back through $p'$ and $p^3$ to the dynamo. The clutch $f^2$ being disengaged, the chain-wheel $e$ runs idle without driving the shaft $f$ and the carriage remains standing. In this manner the accumulator is charged before starting and during the stoppages on the road. By shifting the plate $m$ backward by a movement of the hand-lever $n$ into the position shown on Fig. 3 the inclines in the respective slots move the clutch-box $c^2$ to the right and disengage it from the wheel $d$ and the clutch-box $f^2$ to the left and bring it into gear with the clutch on wheel $e$. At the same time the sector-lever $o'$ is shifted so that the electrical connections are cut. The engine drives the wheel $d$ and the latter drives the wheel $e$ and shaft $f$, while the motor stands still. The engine thus propels the carriage. By shifting the plate $m$ forward from the position shown on Fig. 2 into that shown on Fig. 4 the clutches $c^2$ and $b^2$ remain engaged with the wheel $d$, while $f^2$ is thrown in. The sector is so shifted that the electrical connections are reversed, so that the current from the accumulator passes through the armature of the electric motor in the reverse direction to that in which it flowed while the armature was rotated to charge the accumulator, and consequently rotates the armature in the same direction. The engine and motor combined drive the shaft $f$ and the carriage. By further shifting the plate $m$ to its most forward position (shown on Fig. 5) the clutch $b^2$ is drawn out of gear, the clutches $c^2$ and $f^2$ remaining in the positions shown on Fig. 4, and the electrical connection also remaining the same. In this position the motor drives the carriage, while the engine may be stopped. This last position is intended to be used while passing through streets to avoid the smell of the exhausted oil-vapor, the engine only being used on level road in the country, and both combined for heavy work, such as running up steep or long gradients.

It is obvious that in a position midway between the positions Figs. 2 and 3, with short teeth on the clutch-boxes $c^2$ and $f^2$, both will be disengaged simultaneously, the engine then running idle, and that the slots may be so shaped that this result is obtained in some other position of the plate $m$.

Referring now to Figs. 8 to 12, Fig. 8 represents the back part of the carriage-frame, with an arrangement of an engine and motor running at different speeds and a suitable arrangement of clutch and switch mechanism for obtaining the different ways of driving similarly to the arrangement hereinbefore described. Only those parts are shown which differ from the same. The crank-shaft $b$ of the engine only extends through the fly-wheel B', which is formed with clutch-teeth. In line with the shaft $b$ another shaft $t$ is supported in bearings $t'$ and meets the crank-shaft, having preferably a pivot turned at its end entering into a bore of the crank-shaft $b$. On the shaft $t$ a clutch-box $b^2$ and a clutch or driver $t^2$ can slide and are rotated with it by means of a key. The clutch $t^2$ has two pegs or studs fixed to it, which pass through holes in a chain-wheel $t^3$, that may be fixed or loose on the counter-shaft $t$ and can enter into holes of a spur-wheel $t^4$, which is loose on the shaft $t$. This spur-wheel gears with a wheel $c^6$ on the shaft $c$ of the electric motor C, the ratio of the wheels being inverse to that of the normal speed of the engine and motor. Instead of connecting the shafts $t$ and $c$ by spur-wheels any other suitable way of driving one from the other may be used. The two clutches $b^2$ and $t^2$ are controlled by levers $b^3$ and $c^3$, fulcrumed on studs $b^4$ and $c^4$ on the plate $m'$ and fitted at their other ends with pins $b^5$ and $c^5$, engaging into slots of the sliding plate $m$, which is connected to a hand-lever similarly as hereinbefore described with reference to Figs. 1 to 7. A lever $f^3$ controls the clutch $f^2$ on the sliding shaft $f$ and engages with its pin $f^5$ into another slot of the sliding plate $n$. The sliding clutch-box $f^2$ can engage the clutch formed at the side of the chain-wheel $e$, which is supported and held by collars in the bearing $e'$. A chain passes around the chain-wheels $e$ and $t^3$, so that when the latter is rotated and the clutch-box $f^2$ engaged the shaft $f$ is rotated. From this shaft the motion is transmitted to the driving-wheels of the carriage in the manner hereinbefore described with reference to Figs. 1 and 2, or in any other suitable way. The sliding plate $m$ carries a pin $o$, engaging into the slotted sector-lever $o'$, the sector of which has two electrical insulated contacts connected by wires $p$ and $p'$ to the accumulator, and on the plate $m'$ four segmental insulated contacts are fixed, the outer ends of which are electrically connected to each other and the wire $p^2$, leading to one of the poles of the motor, while the inner contacts are likewise connected to each other and by the wire $p^3$ to the other pole of the motor. When the parts are in the positions shown on Fig. 8, the clutch $b^2$ is disengaged and the electrical connection cut, so that the engine runs idle, the motor, shaft $t$, and shaft $f$ remaining stationary. By shifting the plate $n$ into the position shown on Fig. 9 the clutch $b^2$ is engaged, the clutch $f^2$, however, remaining disengaged. The pegs of clutch $t^2$ are engaged in the holes of the spur-wheel $t^4$ and the switch is brought into a position in which the wires $p$ and $p^3$ and the wires $p'$ and $p^2$ are connected. The engine rotates the shaft $t$ through the clutch $b^2$, and the clutch $t^2$ drives the spur-wheel $t^4$, which through $G^6$ rotates the motor as dynamo for charging the accumulator. The chain-wheel $e$ runs idle, the shaft $f$ remaining at rest. Thus the engine drives the dynamo for charging the accumulator while the carriage remains standing. By shifting the plate $m$ farther back into the position shown on Fig. 10 the clutches $b^2$ and $t^2$ remain in their previous position. The clutch $f^2$ becomes engaged with the wheel $e$. The sector is shifted so that the electrical connections are reversed, wire $p$ being now connected to wire $p^2$ and wire $p'$ to wire $p^3$, as required for driving the motor from the accumulator in the same direction as it was rotated for charging the accumulator. The motor drives the chain-wheel $t^3$ through the wheels $G^6$ and $t^4$ and the clutch $t^2$, and the engine drives the shaft $t$ through the clutch $b^2$, the shaft driving the clutch and the chain-wheel $t^3$. The latter drives the chain-wheel $e$ and shaft $f$. The engine and motor combined thus drive the shaft $f$ and propel the carriage. When the plate $m$ is shifted farther back into the position shown on Fig. 11, the clutch $b^2$ is thrown out of gear, the clutches $t^2$ and $f^2$ remaining engaged, and the electrical connection the same as on Fig. 10. The motor then drives the chain-wheel $t^3$ and throught it the shaft $f$ and propels the carriage. By shifting the plate finally into its most backward position (shown on Fig. 12) the clutch $b^2$ is engaged with the clutch on the fly-wheel $b'$. Clutch $f^2$ remains engaged. Clutch $t^2$ is drawn so far to the left that the pegs on the clutch are drawn out of the wheel $t^4$, but remain in the chain-wheel $t^3$. The electrical connection is at the same time cut by the switch. The motor and wheels $G^6$ and $t^4$ remain stationary, and the engine alone drives the chain-wheel $t^3$ and through it the chain-wheel $e$ and $f$, thus propelling the carriage.

I do not confine myself to the particular arrangement of clutches and switch and mechanism for operating the same; but they may be replaced by their equivalents effecting the same object—namely, to drive the carriage, either by the engine or the motor or preferably also by both combined, and to drive the motor by the engine, so as to charge the accumulators and preferably also allow the engine to run idle.

The carriage-frame is supported at the back by springs $w$ on the axle $w'$ and its front end by the springs $v$ on a stationary axle $v'$, to which the swiveling axles $v^2$ of the front wheels are connected, the axles $v^2$ being turned by means of rods and levers from the central shaft $v^3$, fitted with the hand-wheel $v^4$, Figs. 1 and 2, in the usual manner.

I do not confine myself to the special arrangements of clutches, switches, and mechism for operating the same hereinbefore described; but these may be varied according to the general arrangement or construction of the vehicle without departing from the nature of my invention.

Having now particularly described and ascertained the nature of my said invention and in what manner the same is to be performed, I declare that what I claim is—

1. In an automobile vehicle, the combination, with the driving-shaft, of a hydrocarbon-engine, a motor, a switch, an accumulator, wires electrically connecting said motor, switch and accumulator, means for transmitting motion from said hydrocarbon-engine to said driving-shaft, and means for simultaneously operating said switch and placing said hydrocarbon-engine in engagement with said motion-transmitting means, substantially as set forth.

2. In an automobile vehicle, the combination, with the driving-shaft, of a motor, a switch, an accumulator, wires electrically connecting said motor, switch and accumulator, means for transmitting motion from said motor to said driving-shaft, and means for simultaneously operating said switch and placing said motor in engagement with said motion-transmitting means, substantially as set forth.

3. In an automobile vehicle, the combination, with the driving-shaft, of a hydrocarbon-engine, a motor capable of use as a dynamo, a switch, an accumulator, wires electrically connecting said motor-dynamo, switch and accumulator, means for transmitting motion from said motor-dynamo to the driving-shaft, means for transmitting motion from said hydrocarbon-engine to the motor-dynamo, and means for simultaneously operating said switch and placing said hydrocarbon-engine in engagement with said means for transmitting motion from the hydrocarbon-engine to the motor-dynamo, substantially as set forth.

4. In an automobile vehicle, the combination, with the driving-shaft, of a hydrocarbon-engine, a motor, a switch, an accumulator, wires electrically connecting said motor, switch and accumulator, means for transmitting motion from said hydrocarbon-engine to the driving-shaft, means for transmitting motion from said motor to said driving-shaft, and means for simultaneously operating said switch and placing said hydrocarbon-engine and motor in engagement with their motion-transmitting means, substantially as set forth.

5. In an automobile vehicle, the combination, with the driving-shaft, of a motor, a hydrocarbon-engine, a loosely-mounted chain-wheel provided with clutch members, means for transmitting motion from said chain-wheel to the driving-shaft, clutch members connected with the shafts of the motor and hydrocarbon-engine respectively, and means for throwing either or both of said clutch members into or withdrawing the same from engagement with the clutch members of said chain-wheel, substantially as set forth.

6. In an automobile vehicle, the combination, with the driving-shaft, of a motor, a loosely-mounted chain-wheel provided with a clutch member, means for transmitting motion from said chain-wheel to the driving-shaft, a clutch member connected with the motor-shaft, an accumulator, a switch, wires connecting said accumulator, motor and switch, and means for simultaneously operating said switch and throwing said motor-shaft clutch member into or withdrawing the same from engagement with the clutch member of the chain-wheel, substantially as set forth.

7. In an automobile vehicle, the combination, with the driving-shaft, of a motor, a hydrocarbon-engine, a loosely-mounted chain-wheel provided with clutch members, clutch members connected with the shafts of the motor and hydrocarbon-engine respectively, means for throwing either or both of said clutch members into or withdrawing the same from engagement with the clutch members of the chain-wheel, a second loosely-mounted chain-wheel provided with a clutch member, a chain connecting the first and second chain-wheels, an independently-mounted clutch member, means for transmitting motion from said clutch member to the driving-shaft, and means for throwing said clutch member into or withdrawing the same from engagement with the clutch member of said second chain-wheel, substantially as set forth.

8. In an automobile vehicle, the combination, with the driving-shaft, of a hydrocarbon-engine, a motor, a loosely-mounted chain-wheel provided with clutch members, means for transmitting motion from said chain-wheel to the driving-shaft, clutch members connected with the shafts of the hydrocarbon-engine and motor respectively, an accumulator, a switch, wires electrically connecting said motor, accumulator and switch, and means for throwing either or both of said clutch members into or withdrawing the same from engagement with the clutch members of said chain-wheel and simultaneously operating said switch, substantially as set forth.

9. In an automobile vehicle, the combination, with the driving-shaft, of a motor capable of use as a dynamo, a hydrocarbon-engine, a loosely-mounted chain-wheel provided with clutch members, means for transmitting motion from said chain-wheel to the driving-shaft, clutch members connected with the shafts of the motor-dynamo and hydrocarbon-engine respectively, means for throwing either or both of said clutch members into or withdrawing the same from engagement with the clutch members of said chain-wheel, a second loosely-mounted chain-wheel provided with a clutch member, a chain connecting said first and second chain-wheels, an accumulator, a switch, wires electrically connecting said motor-dynamo, accumulator and switch, an independently-mounted clutch member, means for transmitting motion from said clutch member to said driving-shaft, and means for simultaneously operating said switch and throwing said clutch member into or withdrawing the same from engagement with the clutch member of the second chain-wheel, substantially as set forth.

10. In an automobile vehicle, the combination, of a hydrocarbon-engine, an accumulator, an electric motor capable of use as a dynamo, means for electrically connecting said motor-dynamo with said accumulator, the shafts of said hydrocarbon-engine and motor-dynamo being alined and rotating normally at the same speed, a chain-wheel or its equivalent loosely mounted on said shafts and provided with clutch members, clutch members sliding on said shafts and rotating therewith, means for operating said clutch members, so as to throw either or both into or withdraw the same from the clutch member of said chain-wheel, and a switch or switches interposed in the electric circuit between said accumulator and motor-dynamo whereby the same may be caused to rotate in the same direction both when working as a dynamo in charging the accumulator and when being driven as a motor by said accumulator, substantially as set forth.

11. In an automobile vehicle, the combination of a hydrocarbon-engine, an accumulator, an electric motor capable of use as a dynamo driven by said accumulator at a speed normally below that of the engine, a counter-shaft alined with the engine-shaft and geared to the motor-shaft so as to revolve at the speed of the engine-shaft, a chain-wheel or its equivalent on said counter-shaft and provided with clutch members, clutch members connected with said engine and counter-shafts and adapted to engage the clutch members of the chain-wheel, and thereby couple the engine, or the motor, or both together, to the chain-wheel, means for operating said clutch members, and a switch or switches interposed in the electric circuit between the accumulator and motor-dynamo whereby the latter may be caused to rotate in the same direction both when working as a dynamo in charging the accumulator and when being driven as a motor by said accumulator, substantially as set forth.

12. In an automobile vehicle, the combination, with the driving-shaft, of a hydrocarbon-engine, a motor, an accumulator electrically connected to said motor, a loosely-mounted chain-wheel provided with clutch members, clutch members connected with the shafts of the hydrocarbon-engine and motor respectively, means for throwing either or both of said clutch members into or withdrawing the same from engagement with the clutch members of said chain-wheel, a second chain-wheel mounted on a bush or hollow shaft, and provided with a clutch member, a shaft passing through and adapted to rotate freely in said bush, a clutch member connected with said shaft, means for throwing said clutch member into and withdrawing the same from engagement with the clutch member of said second chain-wheel, and gearing for connecting said shaft with the driving-shaft, substantially as set forth.

13. In an automobile vehicle, the combination, with the driving-shaft, of a hydrocarbon-engine, a motor, means for supplying electricity thereto, a loosely-mounted chain-wheel provided with clutch members, means for transmitting motion from said chain-wheel to the driving-shaft, clutch members on the shafts of the engine and motor respectively, a sliding plate connected with the clutch members of the engine and motor, and means for moving said plate, substantially as set forth.

14. In an automobile vehicle, the combination, with the driving-shaft, of a hydrocarbon-engine, a motor capable of use as a dynamo, a loosely-mounted chain-wheel provided with clutch members, means for transmitting motion from said chain-wheel to the driving-shaft, clutch members connected with the shafts of the hydrocarbon-engine and motor-dynamo respectively, an accumulator, a switch, wires electrically connecting said motor-dynamo, accumulator and switch, a sliding plate connected with the clutch members of the engine and motor, and with said switch, and means for moving said plate, substantially as set forth.

15. In an automobile vehicle, the combination, with the driving-shaft, of a hydrocarbon-engine, a motor, means for supplying electricity thereto, a loosely-mounted chain-wheel provided with clutch members, clutch members on the shafts of the engine and motor respectively, a second loosely-mounted chain-wheel provided with a clutch member, means for transmitting motion from said first to said second chain-wheels, an independently-mounted clutch member adapted to engage the clutch member of the second chain-wheel, means for transmitting motion from said clutch member to the driving-shaft, a sliding plate connected with said independently-mounted clutch member and the clutch members of the engine-shaft and motor-shaft, and means for moving said plate, substantially as set forth.

16. In an automobile vehicle, the combination, with the driving-shaft, of a hydrocarbon-engine, a motor capable of use as a dynamo, a loosely-mounted chain-wheel provided with clutch members, clutch members on the shafts of the engine and motor-dynamo respectively, a second loosely-mounted chain-wheel provided with a clutch member, means for transmitting motion from said first to said second chain-wheels, an independently-mounted clutch member adapted to engage the clutch member of the second chain-wheel, means for transmitting motion from said clutch member to the driving-shaft, an accumulator, a switch, wires electrically connecting said motor-dynamo, accumulator and switch, a sliding plate connected with the independently-mounted clutch member and the clutch members of said engine and motor shafts, and with the switch, and means for moving said plate, substantially as set forth.

17. In an automobile vehicle, the combination with the driving-shaft, of a hydrocarbon-engine, a motor, means for supplying electricity to the same, means for transmitting motion from said hydrocarbon-engine to the driving-shaft, means for transmitting motion from the motor to the driving-shaft, clutch members for coupling the shafts of the engine and motor respectively with said motion-transmitting means, levers for operating said clutch members, a sliding plate connected with said levers and adapted to move the same when operated, and means for moving said plate so as to couple said engine and motor, or either of them, with or uncouple them from their motion-transmitting means, substantially as set forth.

18. In an automobile vehicle, the combination, with the driving-shaft, of a hydrocarbon-engine, a motor capable of use as a dynamo, means for supplying electricity to the same, means for transmitting motion from said hydrocarbon-engine to the driving-shaft, means for transmitting motion from said motor-dynamo to said driving-shaft, clutch members for coupling the shafts of the engine and motor respectively with their motion-transmitting means, levers for operating said clutch members, an accumulator, a switch, wires electrically connecting said motor-dynamo, accumulator and switch, a sliding plate connected with said levers and switch and adapted to move the same when operated, and means for moving said plate so as to couple said engine and motor-dynamo with or uncouple them from their motion-transmitting means and simultaneously operate said switch, substantially as set forth.

In testimony that I claim the foregoing as my invention I have signed my name in presence of two subscribing witnesses.

EDOUARD HENRIQUEZ.

Witnesses:
GREGORY PHELAN,
MAURICE GERBEAULT.